United States Patent [19]
Gulich et al.

[11] 3,777,304
[45] Dec. 4, 1973

[54] INDICATOR

[76] Inventors: Tore Gulich, Marie Dalsvagen 48 D, Malmo; Lennart Stigmark, Fack 24500, Staffanstorp, both of Sweden

[22] Filed: Feb. 28, 1972

[21] Appl. No.: 230,055

[52] U.S. Cl............................. 340/4 R, 324/34 PS
[51] Int. Cl............................................ G01r 33/02
[58] Field of Search............... 340/4 R; 324/8, 34 R, 324/34 PS, 34 D, 44, 47

[56] References Cited
UNITED STATES PATENTS
2,428,360   10/1947   Dingley, Jr.......................... 340/4 R

*Primary Examiner*—Richard A. Farley
*Attorney*—Synnestvedt & Lechner

[57] ABSTRACT

This invention relates to an indicating device for the navigation of vehicles along power cables, especially of ships along underwater cables, wherein a system of coils is mounted on the ship, which coils are adapted to sense the magnetic field surrounding the cables.

4 Claims, 3 Drawing Figures

INDICATOR

SUMMARY OF THE INVENTION

The invention discloses an indicating device for the navigation of vehicles along electric guiding cables, especially for vessels sailing along underwater cables. A system of coils for sensing the cable's magnetic field is provided whereby plural coils are arranged at mutually perpendicular angles corresponding to a three-dimensional coordinate system. Two coils are used to sense induced voltages corresponding to the horizontal component of the magnetic field; these coils are connected to an integrating apparatus which combines the field-induced voltages corresponding to the horizontal component of the magnetic field. For display purposes an oscilloscope is provided which has two pairs of deflector plates arranged mutually perpendicularly. One pair of deflector plates are fed with the output signal from the integrating apparatus while the other pair of plates have connected thereto the voltage induced in a third coil. The induced voltage of the third coil corresponds to the vertical component of the magnetic field.

DETAILED DESCRIPTION OF THE INVENTION

This invention concerns an indicator which, in a very simple and definite way, provides an indication of the position and heading of a vehicle with respect to a cable. The subject indicator automatically eliminates all error signals which might otherwise occur during navigation of ships. Such error signals constitute a particular deficiency of prior art devices.

In an indicating device constructed in accordance with the principles of the present invention, three coils are arranged at mutually perpendicular angles corresponding to a conventional space coordinate system. Two of these coils serve to sense induced voltage signals corresponding to the horizontal component of the magnetic field and these signals are in turn connected as input signals to an integrating apparatus. An oscilloscope is used for position indication purposes, and as such is provided with two pairs of deflecting plates arranged mutually perpendicularly, one pair of plates being supplied with the output signal from the integrating apparatus while the other pair of plates is supplied with a signal corresponding to the voltage induced in the third coil by the vertical component of the magnetic field.

According to the preferred embodiment of the present invention, two coils used to sense the induced voltages corresponding to the horizontal component of the magnetic field are connected to respective ones of paired deflector plates of another oscilloscope to indicate the heading of the vessel. The oscilloscope includes two pairs of deflector plates arranged at mutually perpendicular angles. The three coils are preferably aligned with the longitudinal-vertical, lateral-vertical and horizontal reference planes of the vehicle.

Further details and features of a preferred embodiment of the invention are set out in detail in the following description and drawings wherein.

For illustrative purposes, the indicating device comprising the present invention will be described with reference to a water-borne vehicle.

Figure 1:
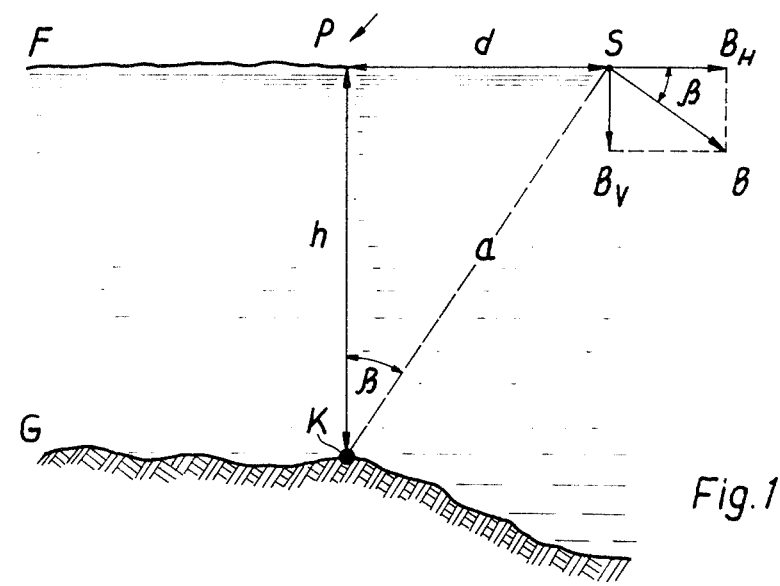
FIG. 1 is a waterway section showing the cable with respect to the position of the vessel.

With reference to FIG. 1, a vessel is considered to be at any position S on a sea's surface F. At the position of a cable K the water has a depth H. The cable K lies on the bottom of the sea G, the cable being surrounded by a concentric magnetic field when current is made to flow through the cable. The distance between the vessel's position S and a point P located on the surface vertically above the cable K is designated as $d$. The distance between K and S is designated as $a$. An angle $\beta$ is enclosed between a and h and its magnitude is proportional to the distance $d$.

The intensity of a magnetic field vector B, at the point S determines the distance a and therefore correspondingly the angle $\beta$. The magnetic field vector B can be resolved into two mutually perpendicular components $B_H$ and $B_V$. Vectors B and $B_H$ form the position angle corresponding to the angle $\beta$.

Figure 2:
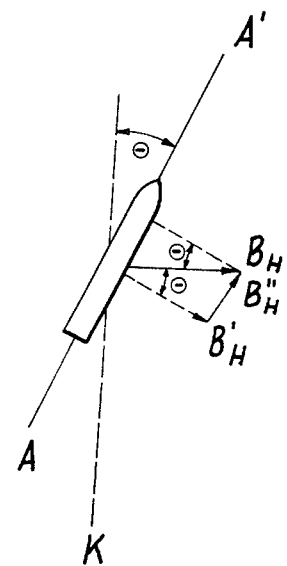
FIG. 2 is a plan view of the vessel with its heading intersecting the cable at an acute angle.
Figure 3:
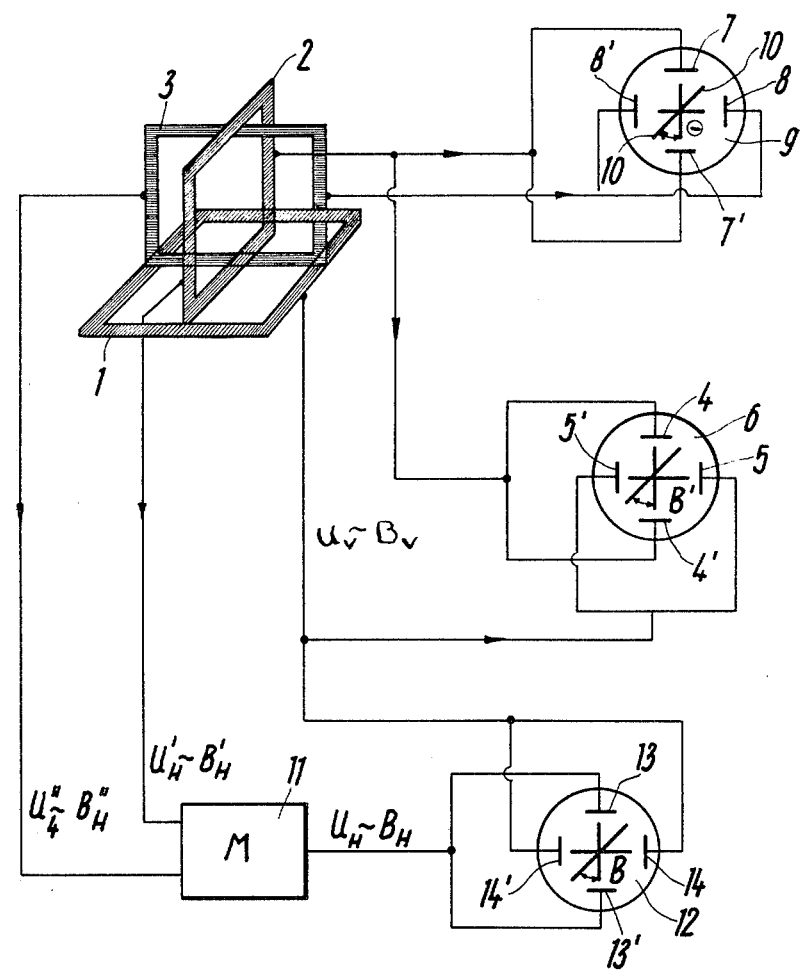
FIG. 3 is a schematic presentation of the onboard measuring device.

Components $B_H$ and $B_V$ generate induced voltages $U_H$ and $U_V$ in the coils 2 and 3, these induced voltages determine the relative position S of the vessel with resect to the cable K. Voltages $U_H$ and $U_V$ are fed into the two mutually perpendicular deflector plates 4, 5 of an oscilloscope 6 to thereby provide a display which corresponds to the position S of the vessel. respect To obtain heading indication A–A' of the vessel (FIG. 2), the deviation $\theta$ of the vessel with respect to the direction of cable K has to be measured. To measure the deviation $\theta$, the horizontal component $B_H$ of the magnetic field is resolved into two mutually perpendicular components $B'_H$ and $B''_H$. The enclosed angle between vectors $B_H$ and $B'_H$ corresponds to the heading angle $\theta$. Components $B'_H$ and $B''_H$ correspond to induced voltages $U'_H$ and $U''_H$ generated in the two mutually perpendicular coils 2, 3. These induced voltages are fed into a pair of mutually perpendicular deflector plates 7, 8 of an oscilloscope 9 resulting in the display of a line 10 whose direction corresponds to the angle $\theta$.

For an exact determination of the vessel's position, account must be taken of the deviation of the vessel with respect to the direction of cable K. For this purpose a voltage $U_H$, corresponding to the field component $B_H$, must be generated in the integrating apparatus 11 by means of a geometric addition of induced voltage components $U'_H$ and $U''_H$. Such voltage $U_H$ is displayed on an oscilloscope 12 as the position angle $\beta$ which corresponds to the true longitudinal heading A–A' of the vessel. To establish the true position and heading, three coils 1, 2, 3 are arranged at mutually perpendicular angles whereby the orientation of these coils correspond to conventional three-dimensional space coordinates. Two of these coils 2 and 3, are used for measuring the horizontal component and the third coil 1 is used to measure the induced voltage corresponding to the vertical component of the magnetic field.

For determining the position angle $\beta$ and the heading angle $\theta$, a conventional dual trace oscilloscope can be used with the possibility of selectively connecting the corresponding paired coils to the inputs for the respective traces.

When the present invention is utilized in a vessel the three coils are aligned with the vessel's longitudinal, lateral and horizontal reference planes; when used in this manner the indicated angles $\beta$ and $\theta$ agree with the exact position of the vessel.

In the application of said indicating device for air or surface vehicles, alternating voltage of a convenient frequency can be applied to the guiding cable K.

We claim:

1. An indicating apparatus for the navigation of vehicles along electric guiding cables, especially for vessels sailing along underwater cables, said vessels having a system of coils for sensing the magnetic field of the cable comprising three coils oriented at mutually perpendicular angles corresponding to a set of space coordinates, two of said coils oriented so as to sense the horizontal component of said magnetic field and generate induced voltages in proportion thereto, said two coils being connected to an integrating apparatus for receiving the magnetic field induced voltages, said indicating apparatus further comprising a position-indicating oscilloscope comprising two pairs of mutually perpendicular deflector plates, one pair of said deflector plates having connected as an input signal thereto the output signal from said integrating apparatus and the other pair of said deflector plates having connected as an input signal thereto the voltage induced in the third coil, said latter induced voltage corresponding to the vertical component of the magnetic field of said cable.

2. A indicating apparatus according to claim 1, wherein each coil for sensing the horizontal components of said magnetic field, is connected to a respective one of the deflector plates of a heading angle indicating oscilloscope comprising two pairs of deflector plates arranged at mutually perpendicular angles, said deflector plates adapted to receive as input signals thereto the magnetic field induced voltages.

3. An indicating apparatus according to claim 2 wherein a common selectively operated oscilloscope is used for position and heading indication.

4. Indicating device according to claim 1 wherein said three coils are aligned with the longitudinal, lateral and horizontal reference planes of the vessel.

* * * * *

UNITED STATES PATENT OFFICE
CERTIFICATE OF CORRECTION

Patent No. 3,777,304      Dated December 4, 1973

Inventor(s) Tore Gulich and Lennart Stigmark

It is certified that error appears in the above-identified patent and that said Letters Patent are hereby corrected as shown below:

IN THE SPECIFICATION

Column 2, line 6, "H" should read --h--.

Column 2, line 23, "resect" should read --respect--.

Column 2, line 27, after the period, delete "respect".

IN THE CLAIMS

Claim 2, first line, "A" should read --An--.

Signed and sealed this 18th day of June 1974.

(SEAL)
Attest:

EDWARD M. FLETCHER, JR.
Attesting Officer

C. MARSHALL DANN
Commissioner of Patents